Patented Jan. 9, 1940

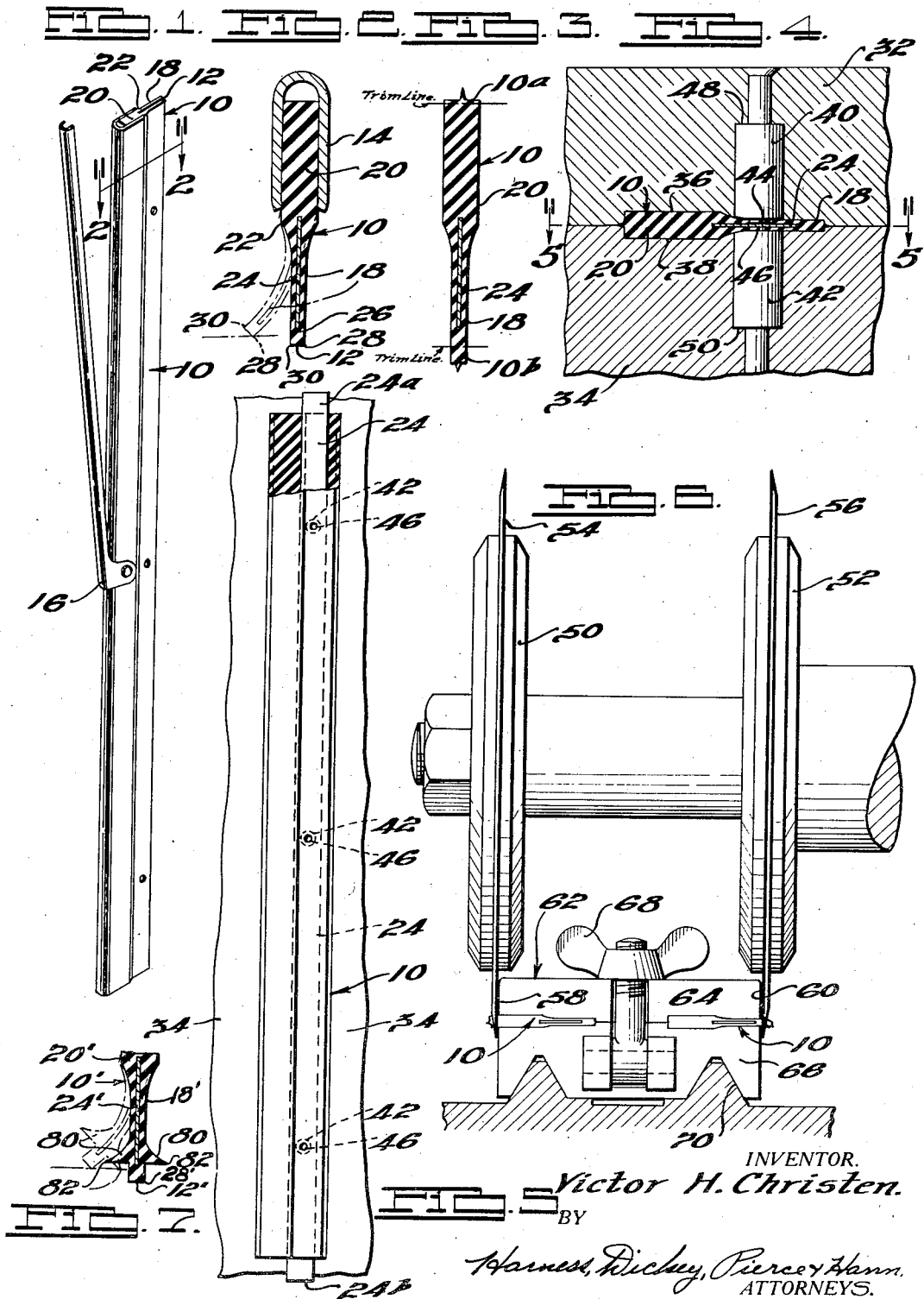

2,186,193

UNITED STATES PATENT OFFICE 2,186,193

WINDSHIELD WIPER BLADE

Victor H. Christen, Detroit, Mich.

Application February 8, 1936, Serial No. 62,889

5 Claims. (Cl. 15—245)

The present invention relates to blades for windshield wiper mechanisms.

Objects of the present invention are to provide a wiper element comprising a relatively thin, flexible wiping strip formed of rubber or its equivalent, having a stiffening element imbedded therein; to provide a wiper element of shouldered formation embodying a relatively thin wiping portion and a relatively thick backing portion adapted to be secured within a channel or other backing member, and including a stiffening element imbedded therein to stiffen and support the relatively thin wiping portion of the strip; to provide such a wiper element in which the stiffening member is flexible to thereby permit limited flexing of the element; to provide a wiper element as just stated in which the forward edge of the stiffening element extends in proximity to the wiping edge of the wiper element, thus providing uniform flexibility of said wiper element over its width; and to provide a shouldered wiper element, as above stated, in which the stiffening element extends from a point adjacent the wiping edge into the enlarged backing portion of the element.

Further objects of the present invention are to provide a wiper assembly, including a supporting channel or corresponding backing member to which a flexible rubber wiping strip is secured in outwardly projecting relation, and embodying a stiffening element imbedded within the wiper strip to strengthen and support the same, the stiffening element being positioned within the wiper strip portion which projects beyond the supporting channel; to provide such an assembly in which the wiper strip is shouldered, having an enlarged backing portion received within the channel and projecting therefrom and having a relatively narrow wiping portion and embodying a stiffening member imbedded within the wiping portion and extending into the shouldered portion; to provide such an assembly in which the stiffening member terminates in that portion of the shouldered portion which projects beyond the channel; to provide such an assembly in which the shouldered portion is adapted to flex relative to the channel and in which the stiffening member extends into such flexing portion of the shouldered part.

Further objects of the present invention are to provide a wiper element comprising a flexible wiping strip having a wiping edge and a projection formed at each side thereof, in spaced relation to the edge; to provide such a wiper element in which the projections are so formed that, in operation, the angle between the faces thereof and the glass or other surface in advance thereof exceeds 90 degrees, so that the projections act to lift or shovel any dirt, mist or other matter from such glass or other surface.

Further objects and advantages of the present invention appear in the following description and in the appended claims.

In its broader aspects, the present invention relates generally to the provision of flexible wiping elements or squeegees suitable for cleaning purposes. In its narrow aspects, the present invention provides an improved squeegee construction particularly adapted for use in windshield wiping mechanisms for vehicles, such as automobiles. The latter constructions conventionally include a backing member or channel, within which a flexible rubber or equivalent wiping strip, formed of one or more laminations, is secured, with the wiping edge thereof projecting a substantial distance beyond the marginal edges of the channel. The channel member is conventionally reciprocated or oscillated across the glass or other area to be cleaned. The friction between the wiping strip and the surface being cleaned flexes the wiping strip, causing the marginal or wiping edge thereof to trail or lag behind the channel. At each reversal of the motion of the wiper, the wiper strip flops relative to the channel, so that the trailing relation thereof to the channel is the same during both directions of travel. In certain instances, the flexibility of the wiper strip is relied upon to provide all of the trailing action. In other instances, the trailing relation provided by the flexibility of the strip is supplemented by providing a loose or sloppy connection between the strip and the actuating mechanism, such, for example, as by loosely connecting the channel to the actuating arm, so that the channel may flop relative thereto. In operation, it will be seen that the principal wiping action, due to the trailing relation of the strip relative to the arm, is effected by the leading marginal edge of the wiper strip, the trailing marginal edge thereof being usually spaced away from the glass because the strip meets the glass at an angle other than 90 degrees.

In order to maintain the just mentioned edge to surface contact, it has been the general practice heretofore to form the strip of relatively thick stock with a view to overcoming the tendency of the strip to flex to such an extent that a substantial portion of the leading face thereof engages the surface to be cleaned, instead of merely the leading marginal edge thereof. The thicker strips are objectionable, however, for a number of reasons; for example, as they wear, and the marginal edges become dulled, the original knife edge contact is lost, and a surface of substantial width is presented to the glass or other surface being cleaned, thereby substantially reducing the effectiveness of the wiper.

In certain aspects, therefore, the present invention is directed principally to the problem of providing a wiper strip which may be constructed in a relatively thin section without introducing the objectionable characteristics above noted. In the illustrated construction, this is accomplished by imbedding a stiffening element within the wiper strip. The stiffening element thus forms a core which supports the material of which the strip is made and strengthens it, and permits the use of an extremely thin strip. By forming the stiffening member of flexible material, the strip as a whole is permitted to flex a limited amount, and in this respect performs in a manner similar to the conventional relatively thick wiping strip, the wiping being effected by the leading marginal edge. Depending upon the stiffness of the wiper strip, the unit may be more or less flexible than the strips heretofore used. In the practice of the present invention, it has been found possible to utilize wiping strips having thicknesses ranging from one-quarter to one-half the thickness of the strips commonly used heretofore. A substantial advantage resulting is that, even after substantial periods of wear, in the course of which the edges may become worn, the very thin strip still presents substantially a knife edge to the glass.

A further advantage resulting from the stiffener or core is that the flexibility of the wiper remains substantially uniform over the life thereof, the stiffener being substantially unaffected by such wear, as distinguished from the tendency of the prior rubber strips to vary greatly in flexibility, due to hardening of the rubber and other causes.

In further accordance with the present invention, means are provided to act upon the glass or other surface to be cleaned, in advance of the above mentioned wiping edge, to effect a preliminary clearing away of any frost, water or other matter which may have collected thereon. With this arrangement, the previously described wiping edge acts to effect a final cleaning or clearing action, or, in a sense, acts to complete or refine the preliminary cleaning action effected by the just mentioned acting means.

In the specific form illustrated the initially acting means constitutes projections formed at each side of the wiping portion of the blade and spaced back somewhat from the wiping edge thereof. In operation, due to the flexing of the wiper blade as previously described, the projection on the leading or forward face of the blade is brought into engagement with the glass or other surface to be cleaned, the other or trailing projection being held in spaced relation from the glass. Thus the glass or other surface is engaged along two contact lines, one contact line being afforded by the previously described wiping edge and the other contact line, in advance of such first contact line, is afforded by the leading projection. The formation and positioning of the projections are such that in operation, the angle between the leading face of the leading projection and the glass or other surface in advance thereof exceeds 90 degrees. The leading projection, therefore, acts as a shovel, which lifts or otherwise scales any frost, water or other foreign matter from the glass or surface. This shoveling action is advantageous in many respects, particular advantages being that it overcomes to a substantial extent the tendency of the wiper element to ride over the top of the matter collected on the glass or other surface to be cleaned, and second in that it reduces the tendency heretofore found in multiple blade wipers for the matter being cleaned from the glass or other surface to collect between the respective blades of the wiper.

Further features and advantages of the present invention appear in the following detailed description of an illustrative but preferred embodiment thereof, shown in the accompanying drawing, throughout the several views of which corresponding reference characters are used to designate corresponding parts, and in which:

Figure 1 is a perspective view, in side elevation, of a wiper assembly embodying the present invention;

Fig. 2 is a view in vertical section, taken along the line 2—2 of Fig. 1;

Fig. 3 is a view in vertical section of the wiper element of the present invention, showing the formation thereof prior to the final trimming operation, and illustrating the trim lines thereof;

Fig. 4 is a view, partly in vertical section, of the improved molding apparatus of the present invention;

Fig. 5 is a view in elevation, taken on the line 5—5 of Fig. 4, and illustrating the condition of the wiper strip after the initial molding operation;

Fig. 6 is a diagrammatic view of preferred trimming apparatus; and

Fig. 7 is a fragmentary view of a wiper element embodying side projections.

Referring first to Figs. 1 and 2, the wiper strip designated generally as 10 comprises an elongated strip of relatively flexible material, such as rubber or its equivalent, the wiping edge 12 of which is accurately formed as a straight edge and thus adapted to have continuous contact with a correspondingly straight windshield or other area to be cleaned. In accordance with conventional practice, strip 10 may be suitably secured within a backing member or channel 14, which in turn may be suitably pivotally connected to an arm 16 associated with suitable actuating mechanism for the wiper. The details of the channel 14 and of the connection thereof to arm 16 form no part of the present invention and so are not illustrated or described in detail. It will be understood that in usual operation, the arm 16 is suitably reciprocated or oscillated to correspondingly reciprocate or oscillate the strip 10 back and forth across the windshield or other area to be cleaned and that in certain instances the channel 14 may be loosely connected to the arm 16 to permit a certain amount of flopping thereof to supplement the flopping action due to the flexibility of strip 10, as hereinafter discussed in more detail.

In the illustrated construction, strip 10 is formed of a relatively thin wiping portion 18 and a wider backing portion 20, which portions merge in sloping shoulders 22. Imbedded within the wiping portion 18 and extending in the illustrated construction somewhat into the backing portion 20, but falling slightly short of the lower edges of the channel 14, is a stiffening member 24. The member 24 is preferably formed of a spring-like metallic strip, for instance steel, brass or the like, although any material having the desired characteristics of stiffness and resiliency may be employed in the broader aspects. The lower edge 26 of member 24 is spaced slightly from the wiping edge 12 of strip 10, by a distance preferably only slightly greater than the thickness of strip 10 so that only a limited flexing of the projecting part occurs independently of the bending of the stiffening member 24. The projecting part, however, serves to permit some deformation in use of the edge 12 from a straight line, thereby enabling the strip to follow irregularities of the glass or other surface. Preferably, the stiffening element 24 is vulcanized or otherwise positively bonded to the strip 10, such bonding being continuous over the surface of the element 24 to thereby prevent working or movement of the element within the strip.

It will be understood that in practice, varying operating conditions will require the use of differing grades of rubber, differing materials for the stiffening elements, and differing dimensions for these parts. It has been found, however, that an effective and satisfactory construction is provided by using a relatively flexible rubber of commercial grade for the strip and spring steel for the stiffening element. In certain instances, it has been found satisfactory to vulcanize the rubber directly to the steel and in certain other instances it is found desirable to first plate the stiffening element where made of steel with brass or other metal having good bonding characteristics. Illustrative dimensions for the strip and for the stiffening element are those given below:

Thickness of portion 18 of strip 10—from .020″ to .040″
Thickness of backing portion 20 of strip 10— from .050″ to .080″
Width of portion 18—3/16″
Distance marginal edge 12 projects beyond element 24—1/16″
Distance strip 10 projects from channel 14—1/4″
Thickness of element 24—.004″–.010″

In the operation of the illustrated embodiment, the strip 10 may be expected to assume substantially the position shown in dotted lines in Fig. 2 relative to the channel 14, assuming movement of the latter to the right as viewed in Fig. 2, and assuming further that channel 14 remains normal to the supporting surface during such movement. In case tilting of channel 14 occurs, it will be understood that the angle of flexure between strip 10 and channel 14 may be somewhat less than that shown. During reverse movement, flexure is in the opposite direction. As shown in the dotted lines, flexure of strip 10 is substantially continuous throughout that portion thereof which projects beyond the edges of channel 14, being primarily determined by element 24. It will be noted that strip 10 engages the surface being cleaned only at the leading marginal edge 28 thereof, the trailing marginal edge 30 being spaced away from the surface. It will be evident that even though edges 28 and 30 may dull somewhat in use, the resulting engaging worn surface will be relatively narrow since the entire thickness of portion 18 is of very small value.

Referring to Figs. 3 through 6, apparatus is illustrated for practicing a preferred method of manufacturing the strip 10 described above. In Fig. 4 a pair of mold members 32 and 34 having opposed and similar cavities 36 and 38, are provided and may be separated and brought into molding relation with each other in any desired or usual way. Proper spacing of the stiffening element 24, so that it will be equidistant from the opposing faces of the strip 10, is insured by use of a plurality of pairs of plungers 40 and 42, which are secured in recesses provided therefor in the mold members 32 and 34, respectively, and which are provided on their inner ends with reduced sections 44 and 46, respectively. Their relation is such that when the mold members 32 and 34 are brought into the position shown in Figure 4, the spacing between the projections 44 and 46 is just sufficient to accommodate the stiffening element 24. The plungers are located in this position through the engagement of the outer ends thereof with shoulders 48 and 50 formed in the mold members. As best seen in Figs. 1 and 5, a plurality of pairs of the plungers are located along the mold in generally spaced relation.

It will be evident that the plungers 40 and 42 are effective to retain the stiffening element 24 in proper position relative to the mold after the sections 32 and 34 are brought together. To effect a preliminary positioning, it is preferred to form the element 24 of an initial length somewhat greater than that of the mold, so that the ends 24a and 24b project therebeyond and may be grasped either manually or by suitable clamps, or may be received in locating grooves in one or both of the mold sections; to locate the strips in accurate relation relative to the molds. Once the molds are brought together, plungers 40 and 42 act both to space strip 24 equidistantly from the mold faces and also to space the edge 26 of element 24 in parallel relation to the wiping edge of the strip.

In the use of the mold, it will be understood that with the mold sections 32 and 34 in separated relation, a stiffening element 24 is properly positioned relative to one of the mold sections in the manner just stated, and a gob of rubber or other compound is placed in one of the cavities 36 and 38 and preferably distributed along the length thereof. Thereafter, the two mold sections are brought together, as an incident to which the plungers 40 and 42 act to properly support element 24 and in the course of which the rubber or other compound is forced into the form shown in Fig. 4. This molding process may be effected under both heat and pressure and results both in molding the rubber to the completed shape shown in Fig. 3 and in vulcanizing the strip to the element 24, the bond being continuous, as previously stated, over the entire surface of the element 24. Ends 24a and 24b may be trimmed off after the molding operation in any usual manner.

The final manufacturing step preferably includes a trimming operation in which the upper edge 10a and the lower edge 10b are trimmed away, the mold dimensions being such as to allow for this trim material. A preferred cutting off mechanism may include, as shown in Fig. 6, a pair of externally driven cutter wheels 50 and 52, the relatively thin blades 54 and 56 of which travel in closely adjacent relation to the sides 58 and 60 of a vise structure 62, formed in upper and lower portions 64 and 66, respectively, which may be clamped together in any suitable way as by the hand screw 68. The upper and lower vise sections 64 and 66 preferably include complementary die sections to conform to the shape of the strip 10. As shown, vise 62 accommodates two strips for each operation, one strip being disposed to have the back thereof trimmed and the other being disposed to have the wiping edge thereof trimmed. The cutter wheels 50 and 52 and the vise structure 62 may be reciprocated relative to each other in any suitable way, vise structure 62 being illustrated as slidably supported upon ways 70. The cutter wheels 50 and 52 are preferable operated at relatively high speeds and, the strip 10 being firmly supported within the vise structure 62, the resulting marginal edges formed by the cutter wheels are very straight. In practice, the supplementing of the molding process by a cutting or trimming operation is found to produce blades of substantially improved quality.

Referring now to the embodiment of the present invention shown in Fig. 7, the wiper element 10′ is constructed in general as described above, being provided with the wiping portion 18′, the shouldered backing portion 20′, and the stiffening element 24′, all of which may and preferably are related to each other in the previously described manner. A projection 80 is formed at each side of the wiping portion 18, adjacent but in spaced relation to the wiping edge 12 thereof, which projections are of tapered formation and terminate in edges 82. The lower surface of each projection 82 may be plane but it is preferred to form the upper surface thereof arcuately.

In operation, the wiper element 10a may be expected to assume substantially the position shown in dotted lines in Fig. 7, for the reasons described more particularly with reference to the preceding figures. In such deflected or trailing position, the leading edge 28′ engages the glass or other surface to be cleaned in the previously described manner. The deflection also brings edge 82 of the leading projection 80 into engagement with the glass or other surface to be cleaned, so that the wiper thus engages such surface along two lines, one afforded by edge 28′ and the other by edge 82.

The projections 80 may be relatively light in weight since they extend only short distances from either face of the element 10′, and receive support from the stiffening element 24′.

It will be noted that the arcuately formed face of the leading projection 82 meets the glass or other surface in advance thereof at an interior angle which exceeds 90 degrees, so that in operation, the edge 82 acts as a shovel to lift or scale foreign matter from the glass. This shoveling action occurs prior to the passage over the glass of the previously described wiping edge 12′ and effects a preliminary cleaning which is completed by the latter wiping edge.

In practice, since the cleaning action afforded by the projections may be regarded as preliminary, it is found to be practical to form the wiping edges 82 by molding, and thus to dispense with the necessity of cutting or machining such edge. The assembly may be characterized, therefore, as combining the economy of a molding operation in forming the projections 80 with the improved operation of a cut edge in forming the wiping edge 12′.

It is thought to be evident that the wiper element illustrated in Fig. 7 may be formed by molding apparatus corresponding in all respects to that described with reference to Figs. 3 through 6, the only difference involved being a suitable modification in the shapes of the mold cavities. It is, therefore, considered unnecessary to describe the molding apparatus in greater detail.

Although specific embodiments of the present invention have been described, as well as specific methods of and apparatus for manufacturing the same, it will be evident that the invention is susceptible of practice in forms other than the described forms. The described embodiments, accordingly, are to be regarded in an illustrative and not in a limiting sense.

What is claimed is:

1. A wiping element comprising a strip formed of flexible material, provided with a wiping edge, and having a stiffening strip of resilient material embedded therein and disposed to flex therewith, said stiffening strip extending in proximity to but in spaced relation to said wiping edge, said spaced distance being insufficient to permit substantial flexing of said wiping edge independent of said stiffening element but sufficient to permit said wiping edge to accommodate itself to irregularities of a surface being wiped.

2. A wiping element comprising a shouldered strip of resilient material, having an enlarged back portion and a relatively thin wiping portion provided with a wiping edge, and a strip of stiffening material embedded in said strip extending from a point in proximity to but spaced from said wiping edge into said enlarged portion, said spaced distance being insufficient to permit substantial flexing of said wiping edge independent of said stiffening element but sufficient to permit said wiping edge to accommodate itself to irregularities of a surface being wiped.

3. A wiper assembly, comprising in combination a backing member; a wiper strip of shouldered formation having a relatively thin wiping portion and an enlarged backing portion, said backing portion being secured within said backing member but having a part projelting therefrom, said wiping portion being provided with a wiping edge; and a stiffening element embedded within said strip and extending from a point in proximity to but spaced from said wiping edge to a point within said projecting part, said spaced distance being insufficient to permit substantial flexing of said wiping edge independent of said stiffening element but sufficient to permit said wiping edge to accommodate itself to irregularities of a surface being wiped.

4. A wiping element comprising a strip of resilient material having a wiping edge, and a resilient projection extending from one side of said strip adjacent to but in spaced relation to said edge, the leading face of said projection being disposed in operation to engage a surface to be cleaned at an interior angle in excess of 90 degrees.

5. A working element formed of resilient material and having a plurality of spaced resilient wiping members with wiping edges disposed to engage a surface to be cleaned in succession, certain of said edges being so formed that the leading face thereof meets such surface at an interior angle in excess of 90 degrees and certain others thereof meeting such surface at an angle less than 90 degrees.

VICTOR H. CHRISTEN.